No. 861,005. PATENTED JULY 23, 1907.
C. WENTZIEN.
FEEDER FOR PIGEONS, SQUABS, OR BIRDS.
APPLICATION FILED APR. 17, 1907.
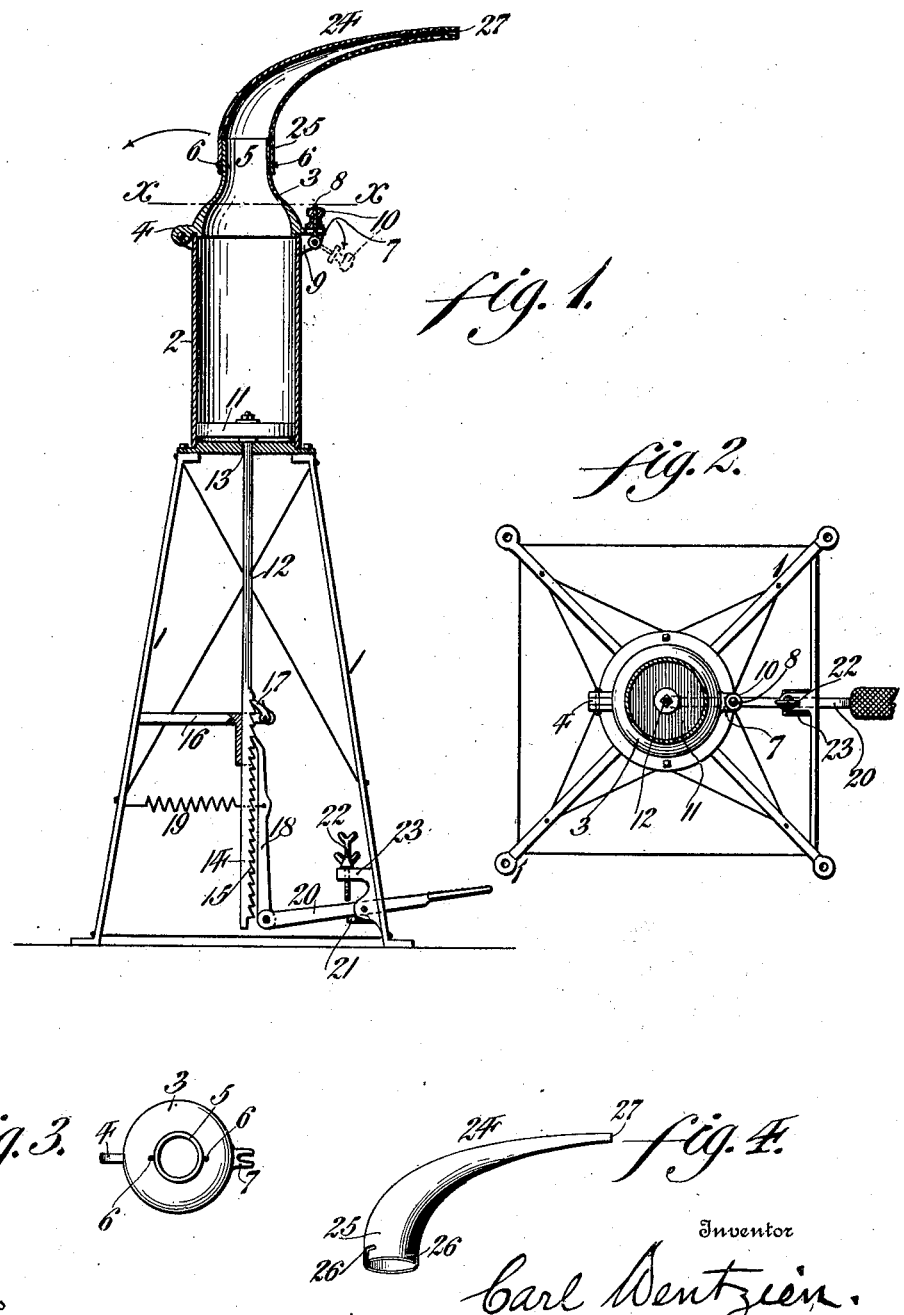

UNITED STATES PATENT OFFICE.

CARL WENTZIEN, OF LAKEWOOD, NEW JERSEY.

FEEDER FOR PIGEONS, SQUABS, OR BIRDS.

No. 861,005.            Specification of Letters Patent.            Patented July 23, 1907.

Application filed April 17, 1907. Serial No. 368,698.

To all whom it may concern:

Be it known that I, CARL WENTZIEN, a citizen of the United States, residing at Lakewood, in the county of Ocean, State of New Jersey, have invented a new and useful Feeder for Pigeons, Squabs, or Birds, of which the following is a specification.

My invention relates to a new and useful feeding device for poultry and the like and consists of means for automatically discharging a predetermined amount of food into the mouth of the bird.

It further consists of other novel details of construction, all as will be hereinafter fully set forth.

Figure 1 represents a partial side elevation and partial sectional view of a feeding device embodying my invention. Fig. 2 represents a sectional view on line x—x, Fig. 1. Fig. 3 represents a plan view of the lid of the receptacle. Fig. 4 represents a perspective view of a removable spout employed.

Similar numerals of reference indicate corresponding parts in the figures.

Referring to the drawings. I have found in practice that by using a machine of this character, I can increase the weight of the birds, as for example squabs, very considerably and at the same time by the use of this feeding device, I am enabled to give as much food to the birds as they are able to digest.

In the drawings, I have shown a construction for carrying out my invention, but it will be evident that other instrumentalities may be employed and different arrangements of the parts may be made which will come within the scope of my invention, and I do not therefore desire to be limited in every instance to the exact construction herein shown and described.

1 designates a stand or support to which is attached in any suitable manner, the cylinder 2. Suitably connected with the cylinder 2 is the lid or cover 3, which, in the present instance, is provided with the ear 4, through which passes a suitable fastening device which is also connected with a suitable part of the cylinder 2, said lid having the tubular portion or mouth 5 and extending from opposite sides thereof are the pins 6.

7 designates a slotted ear projecting from the cap or cover 3 and 8 designates a threaded pin pivotally connected with the extensions 9 on the cylinder 2, said pin 8 being adapted at the proper time to be seated in the slot in the ear 7 and said pin carrying the thumb nut 10, which can be screwed down and caused to engage with the ear 7 in order to hold the cover in closed position.

11 designates a piston movably mounted in the cylinder 2, with which is connected a rod 12, which extends through a suitable opening 13 in the lower wall of the cylinder 2, said rod 12 being provided with a flattened portion 14 and with the teeth 15 at suitable points thereon.

16 designates a guide for the rod which carries the spring actuated pawl 17, which is adapted to engage with the teeth 15 at the proper time.

18 designates a pivoted dog which is spring actuated in the present instance having one end of a spring 19 connected therewith, the opposite end of said spring being suitably connected with a stationary point, said dog 18 being adapted to engage with the teeth 15 for purposes hereinafter described.

20 designates a treadle to which the dog 18 is pivoted, said treadle being suitably pivoted at any desired point on the support 1 and having a stop 21 to prevent downward movement of the treadle beyond that point.

22 designates an adjustable stop to limit the upward movement of the treadle 20, said stop being adjustable in the lip 23 so that the upward throw of the treadle 20 and the dog 18 can be adjusted.

24 designates a spout provided with a suitable neck 25 adapted to receive the tubular discharge 5 of the cap 3, said spout being provided with suitable slots 26 adapted to receive the pins 6 and forming a bayonet joint, so that said spout is removably secured to the cap or cover 3. The discharge opening 27 of the spout is considerably smaller than the inlet thereof, so that said discharge opening can easily be inserted in the mouth of the bird to be fed and the material will be forced therefrom in suitable amounts.

The operation of the device is as follows:—The catch or screw 8 is removed from the ear 7 and the lid thrown back, after which the food is inserted in the cylinder 2, the piston being at its lowermost position. The lid is then placed in position over the cylinder and a nozzle is connected with the discharge 5 of the cap, it being understood that different sized nozzles may be employed depending upon the size of the bird to be fed and the amount of food which is to be passed therethrough. The discharge 27 of the spout 24 is placed in the mouth of the bird and the treadle is depressed. This raises the dog 18 carrying with it the piston 11 and forces a certain amount of food through the cylinder 2, through the spout 24 into the mouth of the bird, the pawl 17 preventing the return of the piston it being noted that as the ratchet is operated the food is intermittently advanced and so fed to the poultry in separate quantities at intervals affording time between each advancement to avoid choking, as will be understood. The discharge end of the spout can then be placed at the mouth of the next bird to be fed and by again depressing the treadle 20, the requisite amount of food is discharged. In this manner it will be seen that the poultry can be quickly fed and that by adjusting the throw of the treadle 20 by means of the adjustable stop 22, the desired amount of food to be forced through the nozzle or spout at each depression of the treadle can be regulated, and the feeding can be quickly and expeditiously accomplished. As previously stated, there is a great advantage in feeding poultry in this manner, inasmuch as the operator can tell the amount of food which the bird can receive and by proper manipulation of the treadle can supply this quantity.

Having thus described my invention, what I claim as new and desire to secure by Letters Patent, is:—

1. In a device of the character described, a cylinder adapted to receive food, a spout connected therewith, a piston movable in said cylinder, and means for intermittently advancing said piston a predetermined distance in order to discharge the food successively at intervals.

2. In a device of the character described, a cylinder adapted to receive food, a removable spout therefor, a piston movable in said cylinder, a rod in suitable connection with said piston, teeth on said rod, and means engaging with said teeth and adapted to actuate the piston a predetermined distance.

3. In a device of the character described, a cylinder adapted to receive food, a removable spout therefor, a piston movable in said cylinder, a rod in engagement with said piston, teeth on said rod, a spring actuated dog in engagement with said teeth, and a treadle for actuating said dog to raise said piston.

4. In a device of the character described, a cylinder adapted to receive food, a removable spout therefor, a piston movable in said cylinder, a rod in engagement with said piston, teeth on said rod, a spring actuated dog in engagement with said teeth, a treadle for actuating said dog to raise said piston, and adjustable means for controlling the throw of said treadle.

5. In a device of the character described, a cylinder adapted to receive food, a removable spout therefor, a piston movable in said cylinder, a rod in engagement with said piston, teeth on said rod, a spring actuated dog in engagement with said teeth, a treadle for actuating said dog to raise said piston, and means for preventing improper return of said piston.

6. In a device of the character described, a cylinder adapted to receive food, a removable spout therefor, a piston movable in said cylinder, a rod in engagement with said piston, teeth on said rod, a spring actuated dog in engagement with said teeth, a treadle for actuating said dog to raise said piston, adjustable means for controlling the throw of said treadle, and a pawl for preventing improper return of said piston.

7. In a device of the character described, a cylinder adapted to receive food, a spout therefor, a piston movable in said cylinder, a rod in suitable connection with said piston, teeth on said rod and means engaging with said teeth and adapted to actuate the piston a predetermined distance.

CARL WENTZIEN.

Witnesses:
F. L. JOHNSON,
S. H. NEWMAN.